(12) United States Patent
Weng (10) Patent No.: US 10,896,522 B2
(45) Date of Patent: Jan. 19, 2021

(54) METHOD AND APPARATUS FOR COMPRESSING IMAGE

(71) Applicant: Baidu Online Network Technology (Beijing) Co., Ltd., Beijing (CN)

(72) Inventor: Renliang Weng, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 105 days.

(21) Appl. No.: 16/130,722

(22) Filed: Sep. 13, 2018

(65) Prior Publication Data
US 2019/0206091 A1   Jul. 4, 2019

(51) Int. Cl.
*G06T 9/00* (2006.01)
*G06K 9/46* (2006.01)
*G06N 3/04* (2006.01)
*G06N 3/08* (2006.01)
*G06K 9/62* (2006.01)
*H04N 19/00* (2014.01)

(52) U.S. Cl.
CPC ............. *G06T 9/002* (2013.01); *G06K 9/46* (2013.01); *G06K 9/4628* (2013.01); *G06K 9/6202* (2013.01); *G06K 9/627* (2013.01); *G06N 3/04* (2013.01); *G06N 3/08* (2013.01); *H04N 19/00* (2013.01)

(58) Field of Classification Search
CPC ........ G06T 9/002; H04N 19/00; G06K 9/627; G06K 9/4628; G06K 9/6202; G06K 9/46; G06N 3/08; G06N 3/04
See application file for complete search history.

(56) References Cited

U.S. PATENT DOCUMENTS

| 5,369,503 | A  | * | 11/1994 | Burel | G06K 9/6251 |
| | | | | | 382/234 |
| 5,822,452 | A  | * | 10/1998 | Tarolli | G06T 9/002 |
| | | | | | 382/166 |
| 10,015,510 | B1 | | 7/2018 | Navarrete Michelini | |
| 10,460,230 | B2 | * | 10/2019 | Brothers | G06N 3/082 |
| 2016/0217369 | A1 | * | 7/2016 | Annapureddy | G06N 3/082 |
| 2017/0076195 | A1 | * | 3/2017 | Yang | G06N 3/0454 |

(Continued)

FOREIGN PATENT DOCUMENTS

CN     105611303 A    5/2016

OTHER PUBLICATIONS

"The picture is too big?! Convolutional neural networks easily achieve lossless compression to 20%!"; Aug. 10, 2017; retrieved from http://www.sohu.com/a/163460325_642762 (6 pages).

*Primary Examiner* — Lewis G West
(74) *Attorney, Agent, or Firm* — Nixon Peabody LLP (57) ABSTRACT

Embodiments of the present disclosure disclose a method and apparatus for compressing an image. A specific embodiment of the method includes: acquiring a to-be-processed image; and performing feature extraction on the to-be-processed image by using a convolutional neural network corresponding to a trained image compression model to obtain a plurality of feature maps, a difference between the to-be-processed image and a reconstructed image obtained by reconstructing the plurality of feature maps through a deconvolution neural network corresponding to a trained image reconstruction model satisfying a preset condition. This embodiment achieves compression of the data size of an image while ensuring the restoration quality of the image.

11 Claims, 5 Drawing Sheets

(56) References Cited

U.S. PATENT DOCUMENTS

| | | | | |
|---|---|---|---|---|
| 2017/0345130 | A1* | 11/2017 | Wang | G06T 3/4053 |
| 2018/0053091 | A1* | 2/2018 | Savvides | G06N 3/08 |
| 2018/0068675 | A1* | 3/2018 | Variani | G10L 21/028 |
| 2018/0075581 | A1* | 3/2018 | Shi | G06N 3/084 |
| 2018/0137388 | A1* | 5/2018 | Kim | G06K 9/623 |
| 2018/0139458 | A1* | 5/2018 | Wang | H04N 19/154 |
| 2019/0102640 | A1* | 4/2019 | Balasubramanian | G06F 3/0656 |

* cited by examiner

METHOD AND APPARATUS FOR COMPRESSING IMAGE

CROSS-REFERENCE TO RELATED APPLICATIONS

This application claims priority to Chinese Patent Application no. 201711477239.8, filed with the China National Intellectual Property Administration (CNIPA) on Dec. 29, 2017, the contents of which are incorporated herein by reference in their entirety.

TECHNICAL FIELD

Embodiments of the present disclosure relate to the field of computer technology, specifically relate to the field of image processing technology, and more specifically relate to a method and apparatus for compressing an image.

BACKGROUND

Image compression refers to a technique of representing an original image pixel matrix with fewer bytes. Typically, an image is compressed for storing to save storage space, and is restored by decompressing when actually used or displayed.

A large number of images containing facial feature information are captured and saved when monitoring a scene. When compressing and storing these images, a large storage space is required to ensure that the images can provide enough information for identification and target tracking, which sets higher requirements on the disk.

SUMMARY

Embodiments of the present disclosure propose a method and apparatus for compressing an image.

In a first aspect, the embodiments of the present disclosure provide a method for compressing an image. The method includes: acquiring a to-be-processed image; and performing feature extraction on the to-be-processed image by using a convolutional neural network corresponding to a trained image compression model to obtain a plurality of feature maps; a difference between the to-be-processed image and a reconstructed image obtained by reconstructing the plurality of feature maps through a deconvolution neural network corresponding to a trained image reconstruction model satisfying a preset condition.

In some embodiments, the image compression model and the image reconstruction model are trained as follows: acquiring a sample image and performing a comparison step; the comparison step includes: inputting the sample image into the image compression model, outputting a plurality of sample feature maps, inputting the plurality of sample feature maps into the deconvolution neural network corresponding to the image reconstruction model to reconstruct the plurality of sample feature maps to obtain a reconstructed image of the sample image, creating a loss function based on a difference between the sample image and the reconstructed image of the sample image, and determining whether a value of the loss function satisfies a preset convergence condition; updating at least one of a parameter of the convolutional neural network corresponding to the image compression model or a parameter of the deconvolution neural network corresponding to the image reconstruction model using a gradient descent method based on the loss function, if a result of the comparison step is negative, and performing the comparison step based on the updated parameter; and outputting the parameter of the convolutional neural network corresponding to the image compression model and the parameter of the deconvolution neural network corresponding to the image reconstruction model, if the result of the comparison step is positive.

In some embodiments, the method for compressing an image further includes: storing a parameter of the convolutional neural network corresponding to the image compression model and a parameter of the deconvolution neural network corresponding to the image reconstruction model.

In some embodiments, the method for compressing an image further includes: storing the plurality of feature maps as a compression result of the to-be-processed image.

In some embodiments, each of the plurality of feature maps comprises at least one pixel having a gray value of a floating-point number; and the method for compressing an image further includes: calculating a maximum value and a minimum value of gray values of a plurality of the pixels in the plurality of feature maps of the to-be-processed image, and converting the gray values of the plurality of pixels in the plurality of feature maps into character data based on the maximum value and the minimum value.

In some embodiments, the method for compressing an image further includes: storing the character data corresponding to the gray values of the plurality of pixels in the plurality of feature maps of the to-be-processed image as an image compression result, and storing the maximum value and the minimum value of the gray values of the plurality of pixels in the plurality of feature maps of the to-be-processed image.

In a second aspect, the embodiments of the present disclosure provide an apparatus for compressing an image. The apparatus includes: an acquisition unit, configured to acquire a to-be-processed image; and a compression unit, configured to perform feature extraction on the to-be-processed image by using a convolutional neural network corresponding to a trained image compression model to obtain a plurality of feature maps; a difference between the to-be-processed image and a reconstructed image obtained by reconstructing the plurality of feature maps through a deconvolution neural network corresponding to a trained image reconstruction model satisfying a preset condition.

In some embodiments, the image compression model and the image reconstruction model are trained as follows: acquiring a sample image and performing a comparison step; the comparison step includes: inputting the sample image into the image compression model, outputting a plurality of sample feature maps, inputting the plurality of sample feature maps into the deconvolution neural network corresponding to the image reconstruction model to reconstruct the plurality of sample feature maps to obtain a reconstructed image of the sample image, creating a loss function based on a difference between the sample image and the reconstructed image of the sample image, and determining whether a value of the loss function satisfies a preset convergence condition; updating at least one of a parameter of the convolutional neural network corresponding to the image compression model or a parameter of the deconvolution neural network corresponding to the image reconstruction model using a gradient descent method based on the loss function, if a result of the comparison step is negative, and performing the comparison step based on the updated parameter; and outputting the parameter of the convolutional neural network corresponding to the image compression model and the parameter of the deconvolution neural network corresponding to the image reconstruction model, if the result of the comparison step is positive.

In some embodiments, the apparatus for compressing an image further includes: a first storing unit, configured to store a parameter of the convolutional neural network corresponding to the image compression model and a parameter of the deconvolution neural network corresponding to the image reconstruction model.

In some embodiments, the apparatus for compressing an image further includes: a second storing unit, configured to store the plurality of feature maps as a compression result of the to-be-processed image.

In some embodiments, each of the plurality of feature maps comprises at least one pixel having a gray value of a floating-point number; and the apparatus for compressing an image further includes a converting unit, configured to: calculate a maximum value and a minimum value of gray values of a plurality of the pixels in the plurality of feature maps of the to-be-processed image, and convert the gray values of the plurality of pixels in the plurality of feature maps into character data based on the maximum value and the minimum value.

In some embodiments, the apparatus for compressing an image further includes: a third storing unit, configured to store the character data corresponding to the gray values of the plurality of pixels in the plurality of feature maps of the to-be-processed image as an image compression result, and store the maximum value and the minimum value of the gray values of the plurality of pixels in the plurality of feature maps of the to-be-processed image.

In a third aspect, the embodiments of the present disclosure provide a server, including: one or more processors; and a storage apparatus, for storing one or more programs, the one or more programs, when executed by the one or more processors, cause the one or more processors to implement the method for compressing an image provided by the first aspect.

In a fourth aspect, the embodiments of the present disclosure provide a computer readable storage medium, storing a computer program thereon, the program, when executed by a processor, implements the method for compressing an image provided by the first aspect.

By acquiring a to-be-processed image, and performing feature extraction on the to-be-processed image by using a convolutional neural network corresponding to a trained image compression model to obtain a plurality of feature maps, a difference between the to-be-processed image and a reconstructed image obtained by reconstructing the plurality of feature maps through a deconvolution neural network corresponding to a trained image reconstruction model satisfying a preset condition, the method and apparatus for compressing an image provided by the embodiments of the present disclosure achieves a substantial compression of the data size of an image while ensuring the restoration quality of the image.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
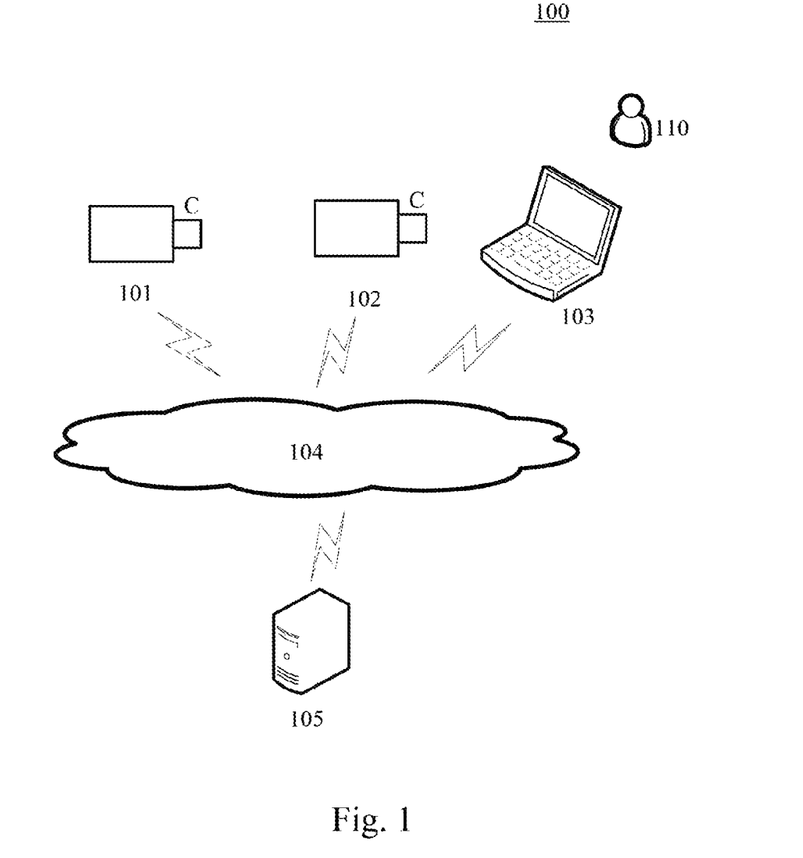
FIG. 1 is an exemplary system architecture diagram to which the present disclosure may be applied.

FIG. 1 shows an exemplary system architecture 100 in which embodiments of a method for compressing an image or an apparatus for compressing an image of the present disclosure may be applied.

As shown in FIG. 1, the system architecture 100 may include image capturing devices 101, 102, a terminal device 103, a network 104, and a server 105. The network 104 serves as a medium providing a communication link between the image capturing devices 101, 102 and the server 105, and between the terminal device 103 and the server 105. The network 104 may include various types of connections, such as wired or wireless transmission links, or optical fibers.

The image capturing devices 101, 102 may interact with the server 105 through the network 104, in order to receive or transmit data. The image capturing devices 101, 102 may be devices for capturing a face image, such as a camera for monitoring a scene, or a mobile electronic device such as a mobile phone or a tablet computer having a camera function. The image capturing devices 101, 102 may have network interfaces, may receive an image acquisition request issued by the server 105, or may upload data to the server 105 for storage or processing through network interfaces.

The user 110 may use the terminal device 103 to interact with the server 105 to receive or transmit messages. The terminal device 103 may be various electronic devices having a user interface including, but not limited to, a smart phone, a tablet computer, a personal computer, and the like.

The server 105 may be a server providing various services, such as a server that stores, analyzes images uploaded by the image capturing devices 101, 102, and a server that responds to an image acquisition request issued by the terminal device 103. After the image capturing devices 101, 102 upload images, the server 105 may compress the uploaded images, encode the images, and store the images in a corresponding storage medium. The user 110 may send a request for reading an image or acquiring an image processing result to the server 105 through the terminal device 103, and the server 105 may parse the request, find the corresponding image, or perform corresponding processing on the image, and then send the search result or the processing result to the terminal device 103.

It should be noted that the method for compressing an image according to the embodiments of the present disclosure is generally executed by the server 105. Accordingly, an apparatus for compressing an image is generally installed on the server 105.

It should be understood that the numbers of the image capturing devices, the terminal devices, the networks and the servers in FIG. 1 are merely illustrative. Any number of image capturing devices, terminal devices, networks and servers may be provided based on the actual requirements. For example, the server may be a clustered server, including multiple servers deployed with different processes.

Figure 2:
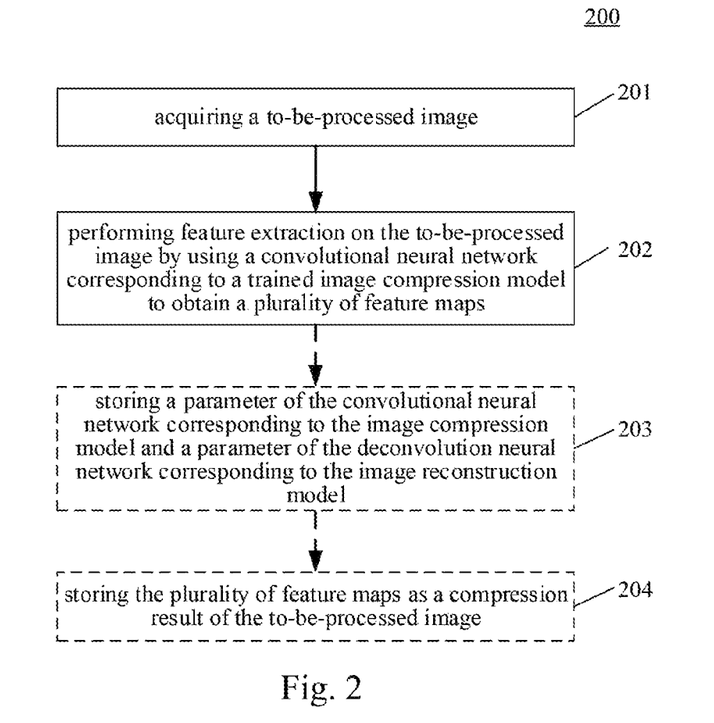
FIG. 2 is a flowchart of an embodiment of a method for compressing an image according to the present disclosure.

Further referring to FIG. 2, a flow 200 of an embodiment of the method for compressing an image according to the present disclosure is illustrated. The method for compressing an image includes the following steps:

Step 201, acquiring a to-be-processed image.

In the present embodiment, the electronic device (e.g., the server 105 as shown in FIG. 1) on which the method for compressing an image runs may acquire a to-be-processed image. The to-be-processed image may be an image captured by the image capturing device, which will be compressed for storing.

The to-be-processed image may be, for example, an image in a video sequence captured when monitoring a scene. Typically, monitoring cameras need to capture images of the monitored scene continuously. The images of the monitored scene may contain related images of people and the place, for example, may include a face image. The number of the images captured when monitoring a scene is large. The images contain abundant image information, and occupy large storage space if stored directly.

In the present embodiment, the electronic device may be connected to the image capturing device to acquire the captured image. The electronic device may receive the to-be-processed image uploaded by the image capturing device in response to the image compression/image storage request issued by the image capturing device, and may also issue a request for acquiring the to-be-processed image to the image capturing device in response to an operation instruction of the user, and receive the to-be-processed image sent by the image capturing device.

Step 202, performing feature extraction on the to-be-processed image by using a convolutional neural network corresponding to a trained image compression model to obtain a plurality of feature maps.

In the present embodiment, the to-be-processed image may be inputted into a trained image compression model for processing. The trained image compression model is created on the basis of a convolutional neural network, which may include at least one convolution layer, and optionally may also include at least one downsampling layer. The convolution layer may include a convolution kernel. The image inputted into the convolution layer is subjected to convolution operation with the convolution kernel to remove redundant image information, and an image containing feature information is output. If the size of the convolution kernel is larger than 1×1, the convolution layer may output a plurality of feature maps having a size smaller than the inputted image. The image outputted from the convolution layer may be downsampled by the downsampling layer (or "pooling layer") to further reduce the image size. After processing through multiple convolution layers, the size of the image inputted into the convolutional neural network undergoes multiple levels of contraction, and a plurality of feature maps that are smaller in size than the image inputted into the convolutional neural network are obtained.

Feature extraction may be performed on the to-be-processed image by using the convolutional neural network corresponding to the image compression model. After processing by the multiple convolution layers in the convolutional neural network, a plurality of feature maps of the to-be-processed image are generated. The plurality of feature maps may be used as a compression result of the to-be-processed image. Here, the plurality of feature maps may be reconstructed through a deconvolution neural network corresponding to a trained image reconstruction model to obtain a reconstructed image, and the difference between the reconstructed image of the to-be-processed image and the to-be-processed image satisfies a preset condition.

The plurality of feature maps obtained by inputting the to-be-processed image into the image compression model may be reconstructed by using a deconvolution neural network corresponding to the image reconstruction model. The deconvolution neural network corresponding to the image reconstruction model may include at least one deconvolution layer, and the deconvolution layer may also include a convolution kernel. The convolution kernel may be used to perform deconvolution operation on the plurality of feature maps, to enlarge the size of the image inputted into the deconvolution layer. Specifically, the image may be expanded by using blank pixels (the value in an image matrix is 0), and then the expanded image is convoluted by the convolution kernel of the deconvolution layer to obtain pixel gray information of the blank region. After processing through at least one deconvolution layer in the image reconstruction model, the plurality of feature maps are reconstructed into a reconstructed image. The reconstructed image is the same size as the to-be-processed image, and the image compression model and the image reconstruction model are trained by using a machine learning method, so that the difference between the reconstructed image and the to-be-processed image satisfies a preset condition. Here, the preset condition may be less than a preset threshold.

In this way, after the plurality of feature maps is obtained by compressing the image, when the to-be-processed image needs to be read, the plurality of feature maps may be reconstructed by using the above-mentioned trained image reconstruction model, and the obtained reconstructed image is the to-be-processed image obtained by restoring.

The image compression model and image reconstruction model may be trained and completed based on marked samples. Specifically, a sample image and a corresponding sample feature map set may be marked. The sample image is used as an input of the image compression model, a prediction result of image compression is outputted and compared with the corresponding sample feature map set, to further adjust the parameter of the image compression model. The sample feature map may be used as an input of the image reconstruction model, a prediction result of image reconstruction is outputted and compared with the corresponding sample image, to further adjust the parameter of the image reconstruction model.

Figure 3:
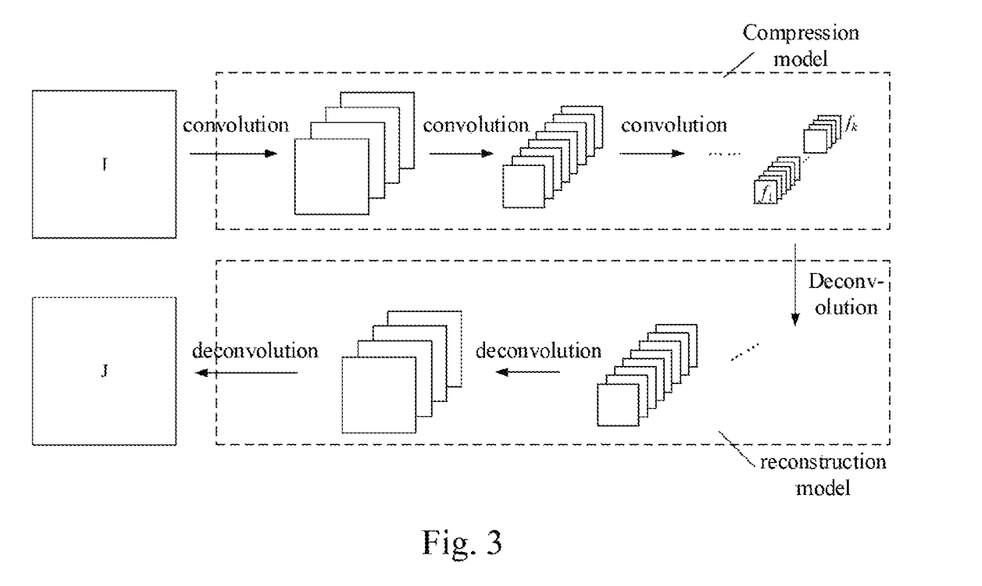
FIG. 3 is a principle schematic diagram of the method for compressing an image according to the present disclosure.

With reference to FIG. 3, a principle schematic diagram of the method for compressing an image according to the present disclosure is illustrated. As shown in FIG. 3, after the to-be-processed image I is inputted into the image compression model, a plurality of feature maps $f_1, f_2 \ldots f_k$ are obtained through a multi-layer convolution operation, where k is a positive integer. The plurality of feature maps $f_1$, $f_2 \ldots f_k$ are subjected to a multi-layer deconvolution operation through the image reconstruction model, and then the reconstructed image J is obtained by restoring. The size of each feature map $f_1, f_2 \ldots$ or $f_k$ is much smaller than the size of the to-be-processed image I. It is assumed that the size of the to-be-processed image I is M×N, and the size of each feature map is m×n, which satisfies: k×m×n is much smaller than M×N.

For example, in an actual scenario, the image compression model may be used to compress a to-be-processed image, and 256 1×1 feature maps are obtained. If the feature values in the feature maps are represented by single-precision floating-point numbers, the compressed data size is 256×4 bytes=1024 bytes. That is, 1024 bytes of space is required to store the feature maps after compression.

By acquiring a to-be-processed image, performing feature extraction on the to-be-processed image by using a convolutional neural network corresponding to a trained image compression model to obtain a plurality of feature maps, a difference between the to-be-processed image and a reconstructed image obtained by reconstructing the plurality of feature maps through a deconvolution neural network corresponding to a trained image reconstruction model satisfying a preset condition, the method for compressing an image provided by the embodiments of the present disclosure achieves compression of the data size of the image while ensuring the restoration quality of the image.

In some alternative implementations of the present embodiment, the flow 200 of the method for compressing an image may further include:

Step 203, storing a parameter of the convolutional neural network corresponding to the image compression model and a parameter of the deconvolution neural network corresponding to the image reconstruction model.

In the present embodiment, the parameter of the convolutional neural network corresponding to the image compression model may be stored. Therefore, after the to-be-processed image is subsequently acquired, the acquired to-be-processed image is compressed by using the image compression model.

The parameter of the deconvolution neural network corresponding to the image reconstruction model may also be stored to restore the image using the image reconstruction model when the stored image is invoked.

Step 204, storing the plurality of feature maps as a compression result of the to-be-processed image.

In the present embodiment, the plurality of feature maps obtained in step 202 may be stored in association with identifiers of the corresponding to-be-processed image, that is, the plurality of feature maps are stored as a compression result of the to-be-processed image. Specifically, the plurality of feature maps obtained by inputting the to-be-processed image into the image compression model may constitute a feature map set, each to-be-processed image corresponds to a feature map set, and the identifier of the corresponding to-be-processed image is set as the identifier of the feature map set. The identifier may be set according to a screen where the to-be-processed image is captured, a capturing device, a capturing time, or a combination thereof. In this way, when the to-be-processed image is extracted, the corresponding feature map set may be extracted according to the identifier.

Through the above steps 203 and 204, storage of the compressed image, the image compression model, and the image reconstruction model is realized. In this way, the same image compression model may be used to compress a batch of to-be-processed images, and the same image reconstruction model may be used to restore a batch of compressed images. In the large-scale image storage scenarios such as monitoring video backup storage, the size of data that needs to be stored is greatly reduced, thereby saving storage space.

In some alternative implementations of the present embodiment, the image compression model and the image reconstruction model may be independently trained, such as the training process described above. In other alternative implementations of the present embodiment, the image compression model and the image reconstruction model may be completed together through a series of associated training.

Figure 4:
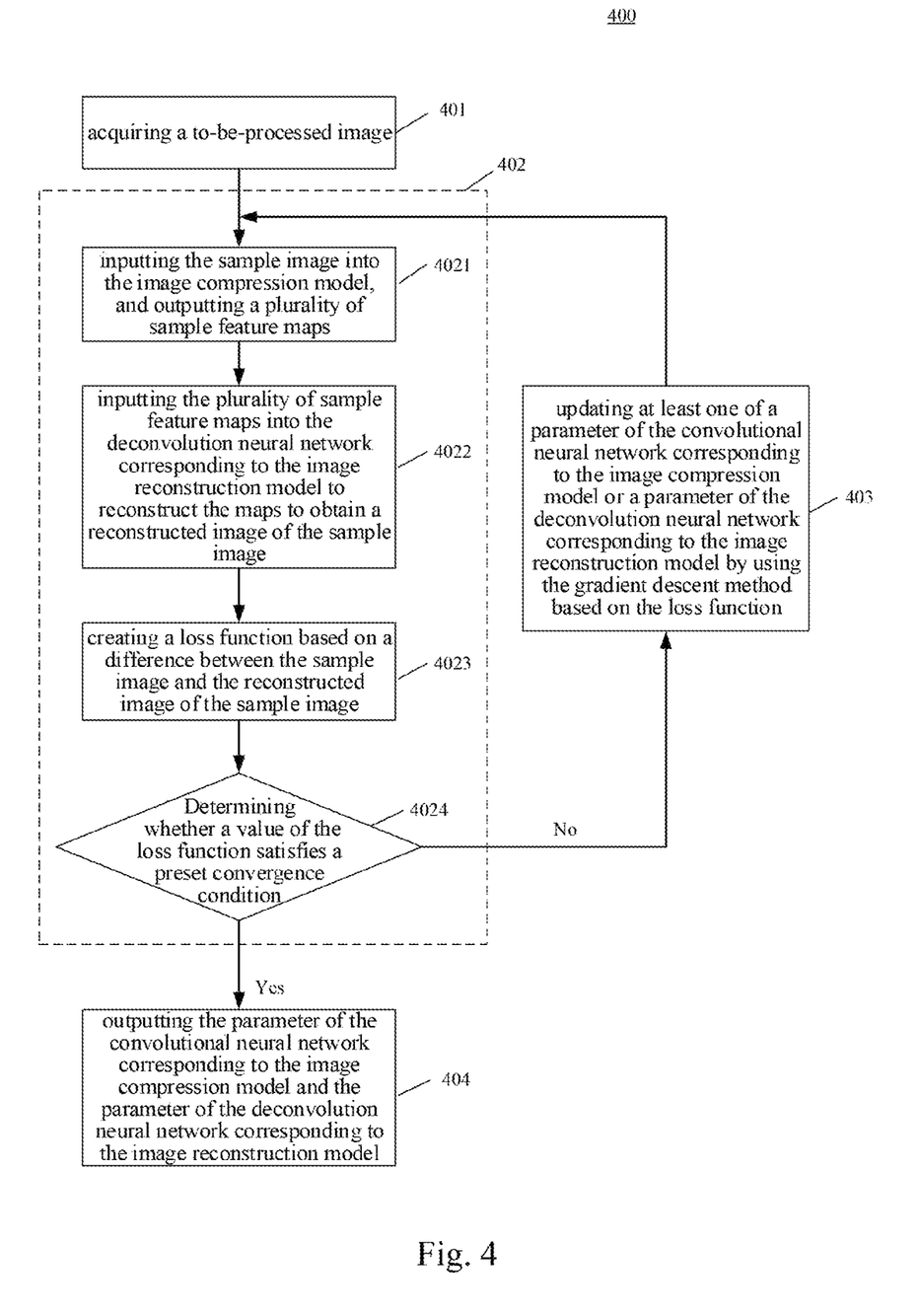
FIG. 4 is a flowchart of an embodiment of a training method of an image compression model and an image reconstruction model.

Further referring to FIG. 4 below, a flowchart of an embodiment of a training method of an image compression model and an image reconstruction model is shown, and specifically a flow of a specific implementation of an associated training of an image compression model and an image reconstruction model is shown. As shown in FIG. 4, the flow 400 of the training method of the image compression model and the image reconstruction model may include:

Step 401, acquiring a sample image.

In the present embodiment, a sample image for training may be acquired. The sample image may be a web image randomly selected from a web gallery, or may be an actual image captured in different scenes. Alternatively, the sample image may be determined according to an image format of the to-be-processed image, a targeted scene type, and the like. For example, when the to-be-processed image is an image of a monitored scene, the sample image may be extracted from the existing image of a monitored scene.

Step 402, performing a comparison step.

Specifically, the comparison step includes step 4021, step 4022, step 4023 and step 4024.

First, step 4021 is performed by inputting the sample image into the convolutional neural network corresponding to the image compression model, and outputting a plurality of sample feature maps.

When the comparison step is performed for the first time, an initial parameter of the convolutional neural network corresponding to the image compression model may be set to initialize the image compression model. When performing the subsequent comparison steps, it may be determined that the parameter of the convolutional neural network corresponding to the image compression model is the parameter updated after the previous execution of the comparison step. Specifically, the parameter of the convolutional neural network corresponding to the image compression model may include convolution kernels of the convolution layers.

The sample image may be inputted into the image compression model, and feature extraction may be performed on the sample image by the convolutional neural network to obtain a plurality of sample feature maps corresponding to the sample image as an image compression result of the sample image in this comparison. Here, the feature sample map is a feature map of the sample image.

Next, step 4022 is performed by inputting the plurality of sample feature maps into the deconvolution neural network corresponding to the image reconstruction model to reconstruct the plurality of sample feature maps to obtain a reconstructed image of the sample image.

The plurality of sample feature maps (i.e., the plurality of feature maps of the sample image) may be inputted into the deconvolution neural network corresponding to the image reconstruction model. A deconvolution operation is performed on the plurality of sample feature maps to obtain a reconstructed image having the same size as that of the sample image.

In the present embodiment, the deconvolution neural network corresponding to the image reconstruction model includes at least one deconvolution layer, and each deconvolution layer includes a convolution kernel. The parameter of the deconvolution neural network is the convolution kernel of each deconvolution layer, and the parameter determination method of the image compression model may also be used. When the comparison step is performed for the first time, an initial parameter of the deconvolution neural network corresponding to the image reconstruction model may be set to initialize the image reconstruction model. When performing the subsequent comparison steps, it may be determined that the parameter of the deconvolution neural network corresponding to the image reconstruction model is the parameter updated after the previous execution of the comparison step.

Then, step 4023 is performed by creating a loss function based on a difference between the sample image and the reconstructed image of the sample image.

The loss function may be used to represent the difference between a prediction result and an actual value of the neural network, that is, to characterize the accuracy of the prediction result of the neural network. In the present embodiment, the loss function may be created on the basis of the difference between the sample images and the reconstructed images obtained by inputting the sample images into the image compression model and the image reconstruction model. Specifically, the loss function L may be created as:

$$L = \sum_i \|I_i - J_i\|_2^2 \quad (1)$$

Here, $I_i$ is the matrix representation of the $i^{th}$ sample image, $J_i$ is the matrix representation of the reconstructed image corresponding to the $i^{th}$ sample image, and $\|I_i-J_i\|_2$ represents the two-norm of $I_i-J_i$.

As may be seen from equation (1), the loss function may be the accumulation of the differences between the sample images and the corresponding reconstructed images. Here, $J_i$ is obtained by sequentially operating $I_i$ through the convolutional neural network corresponding to the image compression model and the deconvolution neural network corresponding to the image reconstruction model. The parameters of the convolutional neural network and the deconvolution neural network are utilized in the process of obtaining $J_i$, so that the loss function may be created based on the parameter of the convolutional neural network corresponding to the image compression model and the parameter of the deconvolution neural network corresponding to the image reconstruction model.

Then, step 4024 is performed by determining whether a value of the loss function satisfies a preset convergence condition.

The sample image and the reconstructed image obtained in step 4022 may be inputted into equation (1), the value of the current loss function is calculated, and then it is determined whether the value of the loss function satisfies a preset convergence condition. The preset convergence condition may be that a preset data interval is reached, or the difference between the value of the loss function and the values of the loss functions in the recent t (t is a positive integer not less than 1) comparison steps is lower than a preset threshold.

If the result of the comparison step 402 is negative, that is, the value of the loss function does not satisfy the preset convergence condition, step 403 is performed to update at least one of a parameter of the convolutional neural network corresponding to the image compression model or a parameter of the deconvolution neural network corresponding to the image reconstruction model using a gradient descent method based on the loss function, and then return to perform the comparison step 402 based on the updated parameter.

The loss function is a function related to the parameter of the convolutional neural network corresponding to the image compression model and the parameter of the deconvolution neural network corresponding to the image reconstruction model. In the present embodiment, the gradient descent method may be used to update at least one of a parameter of the convolutional neural network corresponding to the image compression model or a parameter of the deconvolution neural network corresponding to the image reconstruction model. The difference between the sample image and the corresponding reconstructed image obtained after updating the parameter is reduced. By performing a plurality of iterations of the comparison step 402 and the parameter updating step 403, the value of the loss function is gradually reduced, that is, the difference between the sample image and the corresponding reconstructed image is gradually reduced.

Specifically, the gradient of the loss function relative to the parameter of the convolutional neural network corresponding to the image compression model and the parameter of the deconvolution neural network corresponding to the image reconstruction model may be calculated, then the update amount of each parameter is determined according to a preset step length factor, and the update amount is superimposed with the current parameter to obtain the updated parameter.

It should be noted that, when updating the parameter in step 403, only the parameter of the convolutional neural network corresponding to the image compression model may be updated, or only the parameter of the deconvolution neural network corresponding to the image reconstruction model may be updated. The parameter of the convolutional neural network corresponding to the image compression model and the parameter of the deconvolution neural network corresponding to the image reconstruction model may also be updated simultaneously.

If the result of the comparison step 402 is positive, that is, the value of the loss function satisfies the preset convergence condition, step 404 is executed to output the parameter of the convolutional neural network corresponding to the image compression model and the parameter of the deconvolution neural network corresponding to the image reconstruction model.

If the value of the loss function satisfies the preset convergence condition, the updating of the parameter is stopped, and the parameter of the convolutional neural network corresponding to the image compression model and the parameter of the deconvolution neural network corresponding to the image reconstruction model are outputted, thereby obtaining a trained image compression model and trained image reconstruction model.

Through the above flow 400, associated training of the image compression model and the image reconstruction model may be realized, which is advantageous for simplifying the training process and reducing the number of samples. At the same time, it helps to improve the correlation between the image compression model and the image reconstruction model, and reduce the information loss caused by image compression.

Figure 5:
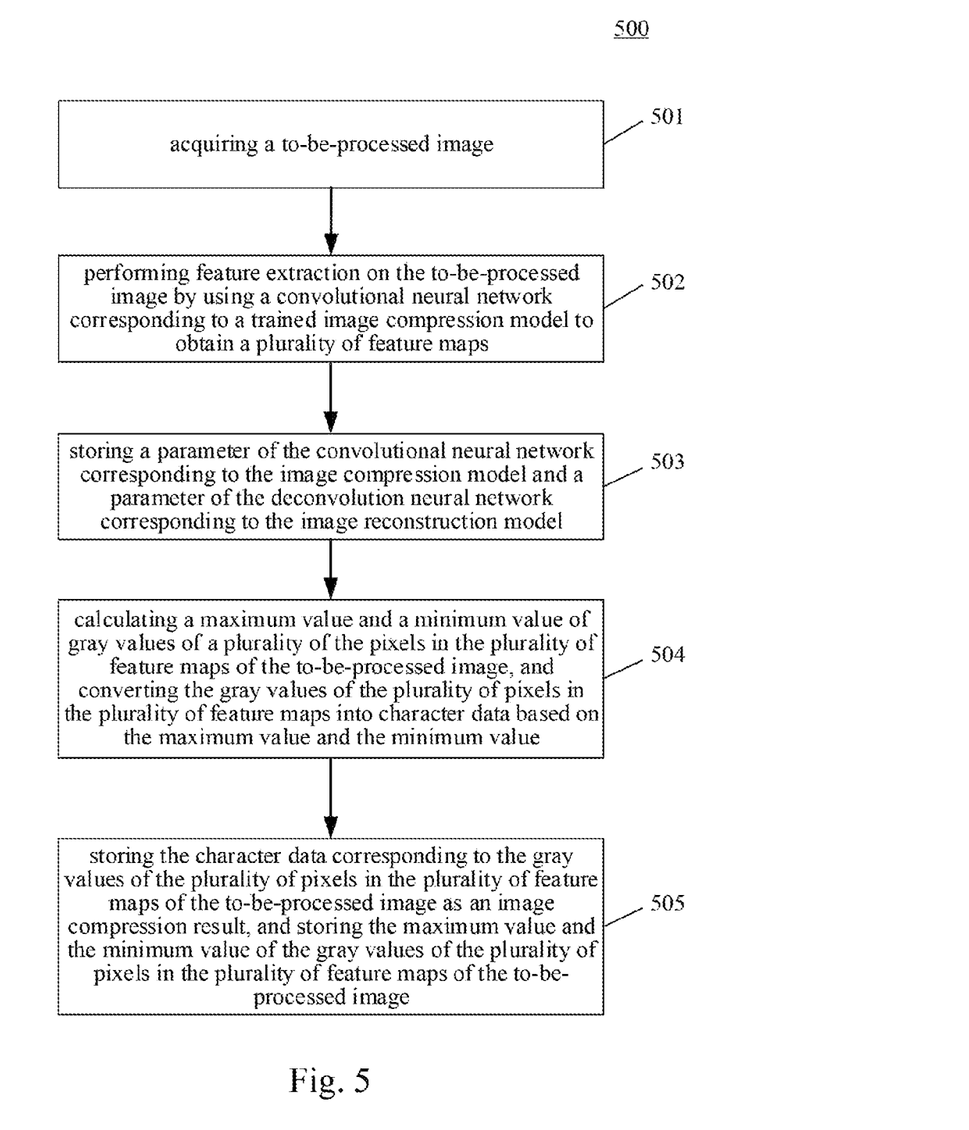
FIG. 5 is a flowchart of another embodiment of the method for compressing an image according to the present disclosure.

Further referring to FIG. 5, a flowchart of another embodiment of the method for compressing an image according to the present disclosure is illustrated. As shown in FIG. 5, the flow 500 of the method for compressing an image of the present embodiment includes the following steps:

Step 501, acquiring a to-be-processed image.

In the present embodiment, the electronic device on which the method for compressing an image operate may acquire a to-be-processed image by connecting to an image capturing device. The to-be-processed image may be an image to be stored after being compressed.

Step 502, performing feature extraction on the to-be-processed image by using a convolutional neural network corresponding to a trained image compression model to obtain a plurality of feature maps.

A difference between the to-be-processed image and a reconstructed image obtained by reconstructing the plurality of feature maps through a deconvolution neural network corresponding to a trained image reconstruction model satisfies a preset condition.

In the present embodiment, the to-be-processed image may be inputted into a trained image compression model. The image compression model may be created based on a convolutional neural network, which may include at least one convolution layer. After the inputted to-be-processed image is subjected to at least one convolution layer operation, a plurality of feature maps containing feature information are generated.

The plurality of feature maps correspond to the to-be-processed image, and the size of each feature map is smaller than the size of the to-be-processed image. Moreover, the plurality of feature images may be restored to a reconstructed image of the same size as that of the to-be-processed image by using the image reconstruction model. Here, the image compression model and the image reconstruction model are obtained by training using a machine learning method, so that the difference between the reconstructed image of the sample image for training and the sample image satisfies a preset condition. Similarly, the difference between the reconstructed image of the to-be-processed image and the to-be-processed image satisfies the preset condition.

Step 503, storing a parameter of the convolutional neural network corresponding to the image compression model and a parameter of the deconvolution neural network corresponding to the image reconstruction model.

In the present embodiment, the image compression model and the image reconstruction model may be stored, and specifically, the parameter of the corresponding convolutional neural network and the parameter of the corresponding deconvolution neural network may be stored. Therefore, after a new to-be-processed image is subsequently acquired, the image is compressed using the image compression model; and when the stored image is read, the stored plurality of feature maps are restored to a reconstructed image of the same size as that of the to-be-processed image by using the image reconstruction model.

Steps 501, 502, and 503 of the present embodiment respectively correspond to step 201, step 202, and step 203 of the foregoing embodiment, and detailed description thereof will be omitted.

Step 504, calculating a maximum value and a minimum value of gray values of a plurality of the pixels in the plurality of feature maps of the to-be-processed image, and converting the gray values of the plurality of pixels in the plurality of feature maps into character data based on the maximum value and the minimum value.

In the present embodiment, the feature map may be composed of at least one pixel having a gray value of a floating-point number. The feature map having a pixel gray value of a floating-point number may be further compressed. Specifically, the maximum value and the minimum value of the gray values of the plurality of pixels in the plurality of feature maps corresponding to each to-be-processed image may be respectively denoted as $f_{max}$ and $f_{min}$. Alternatively, if the size of the feature map is greater than 1×1, the feature map may be converted into a one-dimensional gray scale sequence. For example, a feature map including a 2×2 pixel matrix arranged in a counter clockwise direction is converted into a gray scale sequence composed of gray values of four pixels. Then, the maximum value $f_{max}$ and the minimum value $f_{min}$ are searched for in each gray scale sequence corresponding to the to-be-processed image.

Thereafter, for the gray value f of any one of the pixels in the feature map, the operation of equation (2) may be performed:

$$f_{new} = \text{round}\left(\frac{f - f_{min}}{f_{max} - f_{min}} \times 256\right) \quad (2)$$

Here, round is the rounding function, $f_{new}$ is the character data (char) corresponding to the gray value f of the pixel, and each character occupies one byte after the conversion. The space occupied by the stored image is reduced compared to the floating-point number before the conversion.

Through the above steps 501 to 504, the to-be-processed image may be converted into the gray value of the pixel represented by character data, and the data size of the image is further reduced based on the embodiment shown in FIG. 2.

Step 505, storing the character data corresponding to the gray values of the plurality of pixels in the plurality of feature maps of the to-be-processed image as an image compression result, and storing the maximum value and the minimum value of the gray values of the plurality of pixels in the plurality of feature maps of the to-be-processed image.

In the present embodiment, the character data corresponding to the gray values of the plurality of pixels in the plurality of feature maps of the to-be-processed image may be stored, and the maximum value $f_{max}$ and the minimum value $f_{min}$ of the gray values of the plurality of pixels in the plurality of feature maps of the to-be-processed image are stored. In this way, when reading the to-be-processed image, the stored character data may be first converted into the floating-point number by using the maximum value $f_{max}$ and the minimum values $f_{min}$ to obtain the feature maps, and then the feature maps are inputted into the image reconstruction model to obtain the reconstructed image. By performing step 505, the storage space occupied by the to-be-processed image is further compressed.

Figure 6:
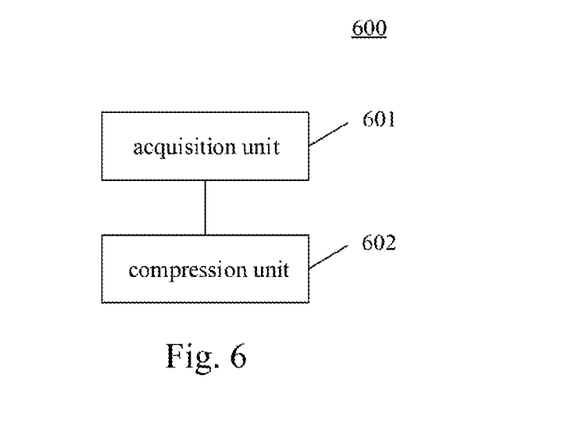
FIG. 6 is a schematic structural diagram of an apparatus for compressing an image according to embodiments of the present disclosure.

Further referring to FIG. 6, as an implementation to the method shown in the above figures, the present disclosure provides an embodiment of an apparatus for compressing an image. The apparatus embodiment corresponds to the method embodiment shown in FIG. 2 and FIG. 5, and the apparatus may specifically be applied to various electronic devices.

As shown in FIG. 6, the apparatus 600 for compressing an image of the present embodiment includes: an acquisition unit 601 and a compression unit 602. The acquisition unit may be configured to acquire a to-be-processed image. The compression unit may be configured to perform feature extraction on the to-be-processed image by using a convolutional neural network corresponding to a trained image compression model to obtain a plurality of feature maps. A difference between the to-be-processed image and a reconstructed image obtained by reconstructing the plurality of feature maps through a deconvolution neural network corresponding to a trained image reconstruction model satisfies a preset condition.

In the present embodiment, the acquisition unit 601 may acquire a to-be-processed image in response to an upload request of the image capturing device, and may also send an acquisition request to the image capturing device in response to receiving an instruction from the user to perform an image compressing operation, and receive the to-be-processed image sent by the image capturing device.

The compression unit 602 may be configured to input the to-be-processed image acquired by the acquisition unit 601 into an image compression model trained by using a machine learning method. The image compression model is created based on a convolutional neural network and is obtained by training based on training sample data, including at least one convolution layer. After the to-be-processed image is subjected to operation by the convolutional neural network corresponding to the image compression model, a plurality of feature maps may be obtained.

The plurality of feature maps are images containing feature information extracted from the to-be-processed image. If the size of the convolution kernel of the convolutional layer in the convolutional neural network corresponding to the image compression model is larger than 1×1, the size of the extracted feature map is smaller than the size of the to-be-processed image. The compression of the to-be-processed image is achieved by a multi-layer convolution operation.

The plurality of feature maps may be reconstructed by a deconvolution neural network corresponding to the image reconstruction model trained by using a machine learning method to obtain a reconstructed image of the to-be-processed image, and the difference between the reconstructed image and the to-be-processed image satisfies a preset condition. Here, the preset condition may be less than a preset threshold. Specifically, the difference between the outputted reconstructed image and the to-be-processed image may be controlled by continuously optimizing and adjusting the parameter of the deconvolution neural network corresponding to the image reconstruction model in training to meet the preset condition.

In some embodiments, the image compression model and the image reconstruction model may be obtained by associated training: acquiring a sample image and performing a comparison step; the comparison step includes: inputting the sample image into the image compression model, outputting a plurality of sample feature maps, inputting the plurality of sample feature maps into the deconvolution neural network corresponding to the image reconstruction model to reconstruct the plurality of sample feature maps to obtain a reconstructed image of the sample image, creating a loss function based on a difference between the sample image and the reconstructed image of the sample image, and determining whether a value of the loss function satisfies a preset convergence condition; updating at least one of a parameter of the convolutional neural network corresponding to the image compression model or a parameter of the deconvolution neural network corresponding to the image reconstruction model using a gradient descent method based on the loss function, if a result of the comparison step is negative, and performing the comparison step based on the updated parameter; and outputting the parameter of the convolutional neural network corresponding to the image compression model and the parameter of the deconvolution neural network corresponding to the image reconstruction model, if the result of the comparison step is positive.

In a further embodiment, the apparatus 600 for compressing an image may further include: a first storing unit, configured to store a parameter of the convolutional neural network corresponding to the image compression model and a parameter of the deconvolution neural network corresponding to the image reconstruction model.

In a further embodiment, the apparatus 600 may further include: a second storing unit, configured to store the plurality of feature maps as a compression result of the to-be-processed image.

In some embodiments, the feature map may be composed of at least one pixel having a gray value of a floating-point number; and the apparatus 600 may further include a converting unit, configured to: calculate a maximum value and a minimum value of gray values of a plurality of the pixels in the plurality of feature maps of the to-be-processed image, and convert the gray values of the plurality of pixels in the plurality of feature maps into character data based on the maximum value and the minimum value.

In some embodiments, the apparatus 600 may further include: a third storing unit, configured to store the character data corresponding to the gray values of the plurality of pixels in the plurality of feature maps of the to-be-processed image as an image compression result, and store the maximum value and the minimum value of the gray values of the plurality of pixels in the plurality of feature maps of the to-be-processed image.

It should be understood that the units in the apparatus 600 correspond to the various steps in the method described with reference to FIGS. 2, 3, 4, and 5. Thus, the operations and features described above for the method are equally applicable to the apparatus 600 and the units contained therein, and detailed description thereof will be omitted.

By acquiring a to-be-processed image by the acquisition unit, performing feature extraction on the to-be-processed image by using a convolutional neural network corresponding to a trained image compression model to obtain a plurality of feature maps by the compression unit, a difference between the to-be-processed image and a reconstructed image obtained by reconstructing the plurality of feature maps through a deconvolution neural network corresponding to a trained image reconstruction model satisfying a preset condition, the apparatus 600 for compressing an image provided by the embodiments of the present disclosure achieves a substantial compression of the data size of an image while ensuring the restoration quality of the image.

Figure 7:
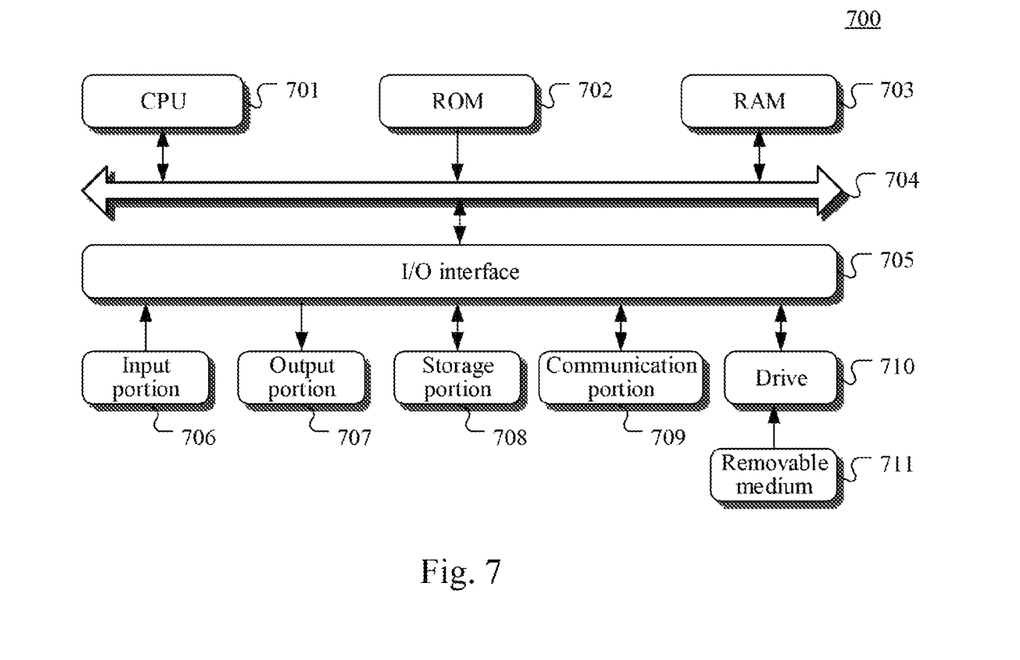
FIG. 7 is a schematic structural diagram of a computer system adapted to implement a server of the embodiments of the present disclosure.

Referring to FIG. 7, a schematic structural diagram of a computer system 700 adapted to implement a server of the embodiments of the present application is shown. The server shown in FIG. 7 is merely an example and should not impose any restriction on the function and scope of use of the embodiments of the present application.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse etc.; an output portion 707 comprising a cathode ray tube (CRT), a liquid crystal display device (LCD), a speaker etc.; a storage portion 708 including a hard disk and the like; and a communication portion 709 comprising a network interface card, such as a LAN card and a modem. The communication portion 709 performs communication processes via a network, such as the Internet. A drive 710 is also connected to the I/O interface 705 as required. A removable medium 711, such as a magnetic disk, an optical disk, a magneto-optical disk, and a semiconductor memory, may be installed on the drive 710, to facilitate the retrieval of a computer program from the removable medium 711, and the installation thereof on the storage portion 708 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 709, and/or may be installed from the removable media 711. The computer program, when executed by the central processing unit (CPU) 701, implements the above mentioned functionalities as defined by the methods of the present disclosure. It should be noted that the computer readable medium in the present disclosure may be computer readable storage medium. An example of the computer readable storage medium may include, but not limited to: semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. The computer readable medium may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in the disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present application may be implemented by means of software or hardware. The described units or modules may also be provided in a processor, for example, described as: a processor, comprising an acquisition unit, and a compression unit, where the names of these units or modules do not in some cases constitute a limitation to such units or modules themselves. For example, the acquisition unit may also be described as "a unit for acquiring a to-be-processed image."

In another aspect, the present application further provides a non-transitory computer-readable storage medium. The non-transitory computer-readable storage medium may be the non-transitory computer-readable storage medium included in the apparatus in the above described embodiments, or a stand-alone non-transitory computer-readable storage medium not assembled into the apparatus. The non-transitory computer-readable storage medium stores one or more programs. The one or more programs, when executed by a device, cause the device to: acquire a to-be-processed image; and perform feature extraction on the to-be-processed image by using a convolutional neural network corresponding to a trained image compression model to obtain a plurality of feature maps; a difference between the to-be-processed image and a reconstructed image obtained by reconstructing the plurality of feature maps through a deconvolution neural network corresponding to a trained image reconstruction model satisfying a preset condition.

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. A method for compressing an image, the method comprising:
   acquiring a to-be-processed image; and
   performing feature extraction on the to-be-processed image by using a convolutional neural network corresponding to a trained image compression model to obtain a plurality of feature maps;
   a difference between the to-be-processed image and a reconstructed image obtained by reconstructing the plurality of feature maps through a deconvolution neural network corresponding to a trained image reconstruction model satisfying a preset condition;
   wherein the image compression model and the image reconstruction model are trained as follows:
   acquiring a sample image and performing a comparison step;
   the comparison step comprises: inputting the sample image into the image compression model, outputting a plurality of sample feature maps, inputting the plurality of sample feature maps into the deconvolution neural network corresponding to the image reconstruction model to reconstruct the plurality of sample feature maps to obtain a reconstructed image of the sample image, creating a loss function based on a difference between the sample image and the reconstructed image of the sample image, and determining whether a value of the loss function satisfies a preset convergence condition;
   updating at least one of a parameter of the convolutional neural network corresponding to the image compression model or a parameter of the deconvolution neural network corresponding to the image reconstruction model using a gradient descent method based on the loss function, if a result of the comparison step is negative, and performing the comparison step based on the updated parameter; and
   outputting the parameter of the convolutional neural network corresponding to the image compression model and the parameter of the deconvolution neural network corresponding to the image reconstruction model, if the result of the comparison step is positive.

2. The method according to claim 1, wherein the method further comprises:
   storing a parameter of the convolutional neural network corresponding to the image compression model and a parameter of the deconvolution neural network corresponding to the image reconstruction model.

3. The method according to claim 2, wherein the method further comprises:
   storing the plurality of feature maps as a compression result of the to-be-processed image.

4. The method according to claim 1, wherein each of the plurality of feature maps comprises at least one pixel having a gray value of a floating-point number; and the method further comprises:
   calculating a maximum value and a minimum value of gray values of a plurality of the pixels in the plurality of feature maps of the to-be-processed image, and converting the gray values of the plurality of pixels in the plurality of feature maps into character data based on the maximum value and the minimum value.

5. The method according to claim 4, wherein the method further comprises:
   storing the character data corresponding to the gray values of the plurality of pixels in the plurality of feature maps of the to-be-processed image as an image compression result, and storing the maximum value and the minimum value of the gray values of the plurality of pixels in the plurality of feature maps of the to-be-processed image.

6. An apparatus for compressing an image, the apparatus comprising:
   at least one processor; and
   a memory storing instructions, the instructions when executed by the at least one processor, cause the at least one processor to perform operations, the operations comprising:
   acquiring a to-be-processed image; and
   performing feature extraction on the to-be-processed image by using a convolutional neural network corresponding to a trained image compression model to obtain a plurality of feature maps;
   a difference between the to-be-processed image and a reconstructed image obtained by reconstructing the plurality of feature maps through a deconvolution neural network corresponding to a trained image reconstruction model satisfying a preset condition;
   wherein the image compression model and the image reconstruction model are trained as follows:
   acquiring a sample image and performing a comparison step;
   the comparison step comprises: inputting the sample image into the image compression model, outputting a plurality of sample feature maps, inputting the plurality of sample feature maps into the deconvolution neural network corresponding to the image reconstruction model to reconstruct the plurality of sample feature maps to obtain a reconstructed image of the sample image, creating a loss function based on a difference between the sample image and the reconstructed image of the sample image, and determining whether a value of the loss function satisfies a preset convergence condition;
   updating at least one of a parameter of the convolutional neural network corresponding to the image compression model or a parameter of the deconvolution neural network corresponding to the image reconstruction model using a gradient descent method based on the loss function, if a result of the comparison step is negative, and performing the comparison step based on the updated parameter; and
   outputting the parameter of the convolutional neural network corresponding to the image compression model and the parameter of the deconvolution neural network corresponding to the image reconstruction model, if the result of the comparison step is positive.

7. The apparatus according to claim 6, wherein the operations further comprise:
   storing a parameter of the convolutional neural network corresponding to the image compression model and a parameter of the deconvolution neural network corresponding to the image reconstruction model.

8. The apparatus according to claim 7, wherein the operations further comprise:
   storing the plurality of feature maps as a compression result of the to-be-processed image.

9. The apparatus according to claim 6, wherein each of the plurality of feature maps comprises at least one pixel having a gray value of a floating-point number; and
   the operations further comprise:
   calculating a maximum value and a minimum value of gray values of a plurality of the pixels in the plurality of feature maps of the to-be-processed image, and converting the gray values of the plurality of pixels in the plurality of feature maps into character data based on the maximum value and the minimum value.

10. The apparatus according to claim 9, wherein the operations further comprise:
    storing the character data corresponding to the gray values of the plurality of pixels in the plurality of feature maps of the to-be-processed image as an image compression result, and storing the maximum value and the minimum value of the gray values of the plurality of pixels in the plurality of feature maps of the to-be-processed image.

11. A non-transitory computer-readable storage medium storing a computer program, the computer program when executed by one or more processors, causes the one or more processors to perform operations, the operations comprising:
    acquiring a to-be-processed image; and
    performing feature extraction on the to-be-processed image by using a convolutional neural network corresponding to a trained image compression model to obtain a plurality of feature maps;
    a difference between the to-be-processed image and a reconstructed image obtained by reconstructing the plurality of feature maps through a deconvolution neural network corresponding to a trained image reconstruction model satisfying a preset condition;
    wherein the image compression model and the image reconstruction model are trained as follows:
    acquiring a sample image and performing a comparison step;
    the comparison step comprises: inputting the sample image into the image compression model, outputting a plurality of sample feature maps, inputting the plurality of sample feature maps into the deconvolution neural network corresponding to the image reconstruction model to reconstruct the plurality of sample feature maps to obtain a reconstructed image of the sample image, creating a loss function based on a difference between the sample image and the reconstructed image of the sample image, and determining whether a value of the loss function satisfies a preset convergence condition;
    updating at least one of a parameter of the convolutional neural network corresponding to the image compression model or a parameter of the deconvolution neural network corresponding to the image reconstruction model using a gradient descent method based on the loss function, if a result of the comparison step is negative, and performing the comparison step based on the updated parameter; and
    outputting the parameter of the convolutional neural network corresponding to the image compression model and the parameter of the deconvolution neural network corresponding to the image reconstruction model, if the result of the comparison step is positive.

* * * * *

UNITED STATES PATENT AND TRADEMARK OFFICE
CERTIFICATE OF CORRECTION

Page 1 of 1

PATENT NO. : 10,896,522 B2
APPLICATION NO. : 16/130722
DATED : January 19, 2021
INVENTOR(S) : Weng It is certified that error appears in the above-identified patent and that said Letters Patent is hereby corrected as shown below:

On the Title Page

Item (30) (Foreign Application Priority Data), please insert --(CN) 201711477239--.

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*